United States Patent [19]

Inoue et al.

[11] Patent Number: 5,391,593
[45] Date of Patent: Feb. 21, 1995

[54] SILICONE RUBBER CURING AND ANAEROBIC SILICONE RUBBER COMPOSITION THEREFOR

[75] Inventors: Yoshio Inoue; Masaharu Takahashi; Tomiyoshi Tsuchida, all of Annaka, Japan

[73] Assignee: Shin-Etsu Chemical Co., Ltd., Tokyo, Japan

[21] Appl. No.: 998,032

[22] Filed: Dec. 29, 1992

[30] Foreign Application Priority Data

Jan. 10, 1992 [JP] Japan ................................. 4-021894
Apr. 15, 1992 [JP] Japan ................................. 4-121300

[51] Int. Cl.$^6$ ......................... C09J 4/00; C08L 83/00
[52] U.S. Cl. .................................... 523/176; 524/588; 524/860; 524/863; 525/477
[58] Field of Search ................. 523/176; 524/588, 860, 524/863; 525/477

[56] References Cited

U.S. PATENT DOCUMENTS

| | | | |
|---|---|---|---|
| 3,198,766 | 8/1965 | Nitzsche et al. | 260/46.5 |
| 3,511,788 | 5/1970 | Keil | 524/588 |
| 4,239,674 | 12/1980 | Homan et al. | 524/588 |
| 4,572,918 | 2/1986 | Lee et al. | 528/42 |
| 4,898,910 | 2/1990 | Kamis et al. | 524/860 |
| 5,051,465 | 9/1991 | Yoshida et al. | 524/588 |

FOREIGN PATENT DOCUMENTS

| | | |
|---|---|---|
| 0110371A1 | 6/1984 | European Pat. Off. |
| 0196169A3 | 10/1986 | European Pat. Off. |
| 0463522A2 | 1/1992 | European Pat. Off. |
| 0493112A1 | 1/1992 | European Pat. Off. |
| 0484119A1 | 5/1992 | European Pat. Off. |
| 2450856 | 11/1980 | France . |
| 131806A | 7/1978 | Germany . |

*Primary Examiner*—Melvyn I. Marquis
*Assistant Examiner*—Karen A. Dean
*Attorney, Agent, or Firm*—Birch, Stewart, Kolasch & Birch

[57] ABSTRACT

A silicone rubber composition comprising (A) an organopolysiloxane, (B) an organic peroxide and (C) carbon black cures under anaerobic conditions into silicone rubber having improved physical properties. A composition further comprising (D) an organopolysiloxane copolymer consisting essentially of M and Q units in a molar M/Q ratio of 6/10 to 9/10 forms an anaerobic adhesive composition which is a useful sealant.

20 Claims, No Drawings

SILICONE RUBBER CURING AND ANAEROBIC SILICONE RUBBER COMPOSITION THEREFOR

BACKGROUND OF THE INVENTION

1. Field of the Invention

This invention generally relates to silicone rubber curing. It also relates to an anaerobic silicone rubber composition and more particularly, to a silicone rubber composition which can cure under anaerobic conditions at room temperature into silicone rubber which provides for bonding and sealing of such parts as screws, bolts, joints, and flanges.

2. Prior Art

Recently silicone rubber has found a spreading use in a new mode of application where molded silicone rubber is bonded to various substrates. As compared with synthetic rubber building gaskets, silicone rubber gaskets are improved in weatherability and flame retardancy and have low compression set, meeting the requirements as waterproof seals for buildings which require long-lasting reliability. Therefore, silicone rubber gaskets now encounter a rapidly increasing demand as waterproof seal in the building industry. These silicone rubber gaskets are used as waterproof seals by attaching them to metal curtain walls, concrete curtain walls, aluminum sashes, aerated lightweight concrete (ALC) panels and other members used as building exterior walls. The silicone rubber gaskets are bonded to exterior walls using such adhesives as silicone sealants.

The silicone sealants, however, are adhesive compositions which cure in the presence of moisture and thus require a substantial time until curing is complete. For instance, where silicone gaskets are attached to exterior walls with silicone sealants, the assembly must be allowed to stand for at least one day before a firm bond can be established between the silicone gaskets and the exterior walls. This means that exterior wall panels cannot be conveyed immediately after their manufacture, leading to low factory production and assembly efficiency.

Also, silicone rubber is used by applying it to screws, bolts, joints and flanges for fixedly securing or sealing them. For such use, a composition comprising a compound having at least one acryloyl or methacryloyl radical in a molecule and an anaerobic initiator is known from Japanese Patent Application Kokai (JP-A) No. 287115/1989. This composition, however, has the drawbacks of increased resin hardness, brittleness and slow curing due to the use of a compound having an acryloyl or methacryloyl radical.

SUMMARY OF THE INVENTION

Therefore, an object of the present invention is to provide a method for preparing silicone rubber having improved heat resistance and other properties by briefly curing a silicone rubber composition under anaerobic conditions.

Another object of the present invention is to provide an anaerobic silicone rubber composition quickly curing into silicone rubber having improved properties.

The inventors have found that a silicone rubber composition comprising (A) an organopolysiloxane of formula (1), (B) an organic peroxide of formula (2), and (C) carbon black cures under anaerobic conditions. Formulae (1) and (2) are defined below.

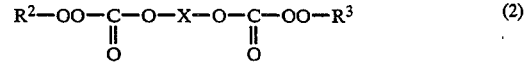

In formula (1), $R^1$ is independently selected from substituted or unsubstituted monovalent hydrocarbon radicals, and letter a is a positive number of from 1.90 to 2.05.

In formula (2), X is a radical of the following formula (3), (4) or (5).

wherein n is an integer of 2 to 8 and m is an integer of 1 to 4, $R^2$ and $R^3$ each are a monovalent hydrocarbon radical having 3 to 10 carbon atoms or a radical of the following formula (6):

wherein $R^4$ is an alkyl or aryl radical.

In general, silicon rubber vulcanization techniques involve vulcanization with organic peroxides and vulcanization utilizing platinum catalyzed addition reaction and thus mostly require heat curing during molding. In this regard, the inventors previously proposed the organic peroxides of formula (2) as defined above which allow for hot atmospheric vulcanization in JP-A 130663/1988 and U.S. Pat. No. 5,051,465. Though the continuing research works, surprisingly we have found that a silicone rubber composition containing this organic peroxide and carbon black exhibits quite unexpected anaerobic curing phenomenon, that is, can quickly cure under anaerobic conditions even at room temperature. We have first succeeded in providing a silicone rubber composition with anaerobic curing ability in a manner completely distinct from the prior art. The anaerobically cured silicone rubber has physical properties comparable to heat cured ones. Possible curing in a sealed enclosure or under air shielded conditions eliminates a need for heat source. Eliminated use of press machines or vulcanization towers for providing high temperature results in a substantial reduction of installation cost.

In one preferred embodiment, the silicone rubber composition further includes (D) an organopolysiloxane copolymer consisting essentially of $R^1{}_3SiO_{\frac{1}{2}}$ units to be referred to as M units and $SiO_2$ units to be referred to as Q units wherein $R^1$ is as defined above, the molar ratio of M/Q being from 0.6 to 0.9. Since this preferred composition quickly cures under anaerobic conditions and exhibits good adhesion at an initial curing stage, it is a very useful anaerobic silicone adhesive.

Accordingly, the present invention in one form provides a method for preparing silicone rubber by curing under anaerobic conditions a silicone rubber composition comprising (A) an organopolysiloxane of formula (1), (B) an organic peroxide of formula (2), (C) carbon black, and optionally (D) an organopolysiloxane copolymer consisting essentially of M and Q units in a molar ratio of from 6/10 to 9/10. In another form, the present invention provides such an anaerobic silicone rubber composition.

DETAILED DESCRIPTION OF THE INVENTION

Component (A) of the anaerobic silicone rubber composition according to the present invention is an organopolysiloxane of the general formula (1).

$$R^1{}_a SiO_{(4-a)/2} \tag{1}$$

In formula (1), $R^1$ is independently selected from substituted or unsubstituted monovalent hydrocarbon radicals, preferably having 1 to 10 carbon atoms, more preferably 1 to 8 carbon atoms, for example, alkyl radicals such as methyl, ethyl, propyl, and butyl, alkenyl radicals such as vinyl, allyl, and butenyl, aryl radicals such as phenyl and tolyl, and substituted radicals wherein the foregoing radicals have some or all of the hydrogen atoms attached to the carbon atoms of the radicals replaced by halogen atoms, cyano and/or other groups, for example, chloromethyl, chloropropyl, 3,3,3-trifluropropyl, and 2-cyanoethyl radicals. The radicals represented by $R^1$ may be the same or different. The letter a is a positive number having a value of from 1.90 to 2.05. The organopolysiloxane preferably has a straight-chain molecular structure although partial inclusion of a branched-chain structure in the molecule is acceptable. It is desired that the organopolysiloxane be end blocked with a triorganosilyl or hydroxyl radical. Examples of the triorganosilyl radical include trimethylsilyl, dimethylvinylsily, methylphenylvinylsilyl, methyldiphenylsilyl, methyldivinylsilyl, and trivinylsilyl radicals.

The organopolysiloxane is not limited in degree of polymerization although it preferably has a degree of polymerization such that its viscosity is at least 300 centistokes (cs) at 25° C. For better curing properties, the organopolysiloxane contains 0 to 10 mol %, especially 0.05 to 5 mol % of an alkenyl radical based on the total moles of the $R^1$ radicals.

In order that the silicone rubber composition function as an anaerobic adhesive, each organopolysiloxane molecule should preferably contain 0.0001 to 0.5 mol % of an alkenyl radical based on the total moles of the $R^1$ radicals. Also the organopolysiloxane preferably has a degree of polymerization of at least 3,000 because initial adhesion would be sometimes low with a degree of polymerization of less than 3,000.

Component (B) is an organic peroxide of the general formula (2).

$$R^2-OO-\underset{\underset{O}{\|}}{C}-O-X-O-\underset{\underset{O}{\|}}{C}-OO-R^3 \tag{2}$$

In formula (2), X is a radical of the following formula (3), (4) or (5):

$$-(CH_2)_n- \tag{3}$$

$$-CH_2-\underset{\underset{CH_3}{|}}{\overset{\overset{CH_3}{|}}{C}}-CH_2- \tag{4}$$

$$-(C_2H_4O)_m-C_2H_4- \tag{5}$$

wherein n is an integer of 2 to 8 and m is an integer of 1 to 4.

$R^2$ and $R^3$, which may be identical or different, are independently selected from monovalent hydrocarbon radicals having 3 to 10 carbon atoms, for example, n-propyl, isopropyl, t-butyl, n-butyl, n-amyl, t-amyl, hexyl, heptyl, octyl, 2-ethylpropyl, 2-ethylbutyl, 2-ethylhexyl, cumyl or the like. Alternatively, $R^2$ and $R^3$ are independently selected from radicals of the following formula (6):

$$-SiR^4{}_3 \tag{6}$$

wherein $R^4$ is an alkyl radical having 1 to 8 carbon atoms such as methyl and ethyl or an aryl radical having 6 to 10 carbon atoms such as phenyl.

Component (B) or organic peroxide serves as a vulcanizing agent and is preferably used in amounts of about 0.1 to 5 parts, especially about 0.5 to 3 parts by weight per 100 parts by weight of component (A) or organopolysiloxane or 100 parts by weight of components (A) and (D) combined if (D) is blended. Less than 0.1 parts on this basis of organic peroxide would be too small to provide for vulcanization, failing to obtain desired or practically acceptable properties. More than 5 parts of organic peroxide would leave an excess of decomposition residue which would be deleterious to the cured silicone rubber or which would invite a superfluous cost increase.

Component (C) is carbon black which is blended for the purpose of improving the curing properties of and/or imparting electrical conductivity to the anaerobic silicon rubber composition. Any of the carbon black species commonly used in conventional rubber compositions may be used. Examples include acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes Denka Acetylene Black manufactured by Denki Kagaku K.K., Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International.

Carbon black is selected from conductive carbon black species where conductivity is required. For improved curing, furnace black, Ketjen Black, channel black and acetylene black are preferred although others may be used.

The amount of carbon black added is not critical although it is preferably added in amounts of about 0.1 to 100 parts, more preferably about 1 to 70 parts by weight per 100 parts by weight of component (A) or 100 parts by weight of components (A) and (D) combined if (D) is blended. Less than 0.1 parts on this basis of carbon black would be too small to provide for anaerobic curing, failing to obtain desirable cured properties whereas more than 100 parts of carbon black would adversely affect mechanical strength.

In embodiments where the silicone rubber composition of the invention is used as an anaerobic adhesive, the composition contains an additional component (D) in the form of an organopolysiloxane copolymer in addition to components (A) to (C). The organopolysiloxane copolymer consists essentially of $R^1{}_3SiO_{\frac{1}{2}}$ units referred to as M units and $SiO_2$ units referred to as Q units. $R^1$ is as defined above.

For the organopolysiloxane copolymer to perform, it is critical that the molar ratio of M/Q range from 0.6 to 0.9. Inclusion of more M units beyond this range results in losses of initial adhesion and other properties. Shortage of M units below the range makes it difficult to produce a copolymer in a consistent manner.

The organopolysiloxane copolymer may contain up to 50 mol % of additional units other than M and Q units, for example, $R^1SiO_{3/2}$ and $R^1{}_2SiO_{2/2}$ units wherein $R^1$ is as defined above, insofar as the benefit of the composition exhibiting high adhesion from an early stage of curing is not lost.

The organopolysiloxane copolymer may be readily prepared by a per se known method, for example, by blending $R^1{}_3SiCl$ and $SiCl_4$ in amounts such that the molar ratio of M/Q units may fall within the above-defined range, followed by co-hydrolysis condensation.

Preferably, component (D) is blended with component (A) such that the weight ratio of component (A)/(D) may range from 30/70 to 70/30, especially from 40/60 to 60/40. If the amount of component (D) is outside the range, some defects would occur like a loss of initial adhesion.

If desired, the silicone rubber composition may contain dispersants such as low molecular weight siloxanes having a degree of polymerization of up to 100, silanol group-containing silanes, and alkoxy group-containing silanes, heat resistance modifiers such as iron oxide, cerium oxide and iron octylate, pigments and the like. Further, fillers may be blended for reinforcement or extending purposes. Any of well-known fillers may be used, for example, finely divided silica, fumed silica, precipitated silica, diatomaceous earth, metal oxides such as iron oxide, zinc oxide and titanium oxide, which may be surface treated with silanes to have hydrophobic properties, metal carbonates such as calcium carbonate, magnesium carbonate and zinc carbonate, asbestos, glass fibers, powder mica, and fused silica powder.

Also optionally included in the composition are thixotropic agents such as polyethylene glycol and derivatives thereof, pigments, dyes, anti-oxidants, antistatic agents, flame retardants such as antimony oxide and chlorinated paraffin, heat transfer modifiers such as boron nitride and aluminum oxide, and the like. There may also be blended tackifiers such as organic silicon compounds having reactive organic radicals such as amino, epoxy and mercapto radicals, silane coupling agents and the like. Other additives which can be blended herein include plasticizers, anti-sagging agents, anti-staining agents, preservatives, bactericidal agents and fungicidal agents.

The anaerobic silicone rubber composition may be obtained by uniformly blending essential components, that is, components (A), (B) and (C) and optional components including component (D). The order of blending these components is not critical although the Composition is generally prepared by first blending component (A) or organopolysiloxane with carbon black and the like, and then blending the mixture with component (B) or organic peroxide as by kneading in a Banbury mixer or roll mill.

According to the present invention, the anaerobic silicone rubber composition is cured into silicon rubber under anaerobic conditions, for example, in closed conditions or in the absence of air or oxygen. For example, a silicon rubber sheet may be manufactured by interposing the composition between a pair of plastic or metallic plates, and allowing the assembly to stand in air-shielded conditions while pressing the composition therebetween at room temperature. Then the composition will fully cure at room temperature within 1 to 3 days, resulting in a cured sheet having physical properties comparable to those of a heat cured sheet. Alternatively, the composition may be cured by filling narrow spaces such as grooves, holes and gaps with the composition and allowing the fill to stand there, or by placing the composition within a mold cavity in a sealed manner.

It is to be noted that since the silicone rubber composition is of an anaerobic curing type, those surface portions thereof in contact with air would be vulcanized to a less extent. In this event, if desired, the surface can be fully vulcanized by combining heat vulcanization using hot air. Voluminous moldings such as industrial rolls may be manufactured by wrapping the composition around a mandrel, covering the composition surface with plastic film and allowing the composition to cure at room temperature. Also in this case, heat vulcanization may be additionally effected on the surface side.

Since the anaerobic silicone rubber composition cures under anaerobic conditions to silicone rubber having improved physical properties, the silicone rubber curing method according to the present invention is particularly adapted in applying the composition to joints, fittings and flanges of screws, bolts and similar members for adhesion and bonding. The method is also suitable in using the composition as gap sealants, building gaskets, EMI shielding agents or the like.

In the preferred embodiment wherein the composition has component (D) blended and thus serves as an anaerobic adhesive, the composition which readily cures at room temperature under anaerobic conditions is applied to any desired substrate or support such as a building wall. A silicone gasket is placed on the coated substrate under pressure. Then the composition cures between the substrate and the gasket while exhibiting improved adhesion from an early stage of curing. In applying the adhesive to the substrate, the adhesive may be diluted with suitable solvents, for example, hydrocarbon solvents such as toluene, xylene and petroleum ether, and ketone and ester solvents.

EXAMPLE

Examples of the present invention are given below together with comparative examples by way of illustration and not by way of limitation. All parts are by weight. The viscosity was often measured in centistoke at 25° C. Me is methyl and Vi is vinyl.

Examples 1-2 & Comparative Examples 1-2

Silicone rubber compositions were prepared by kneading 100 parts of an organopolysiloxane consisting of 98.975 mol % of dimethylsiloxane units and 1.0 mol % of methylvinylsiloxane units and blocked with 0.025 mol % of a dimethylvinylsilyl group at each end had having a viscosity of $1 \times 10^7$ cs and 45 parts of acetylene black in a pressure kneader, and adding the following peroxide A to the base compound in the amount shown in Table 1.

Peroxide A

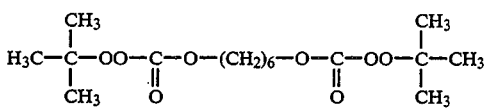

Next, each of the silicone rubber compositions was sheeted to a thickness of 2 mm through a twin roll mill. The sheet on both the surfaces was sandwiched between a pair of polyethylene terephthalate (PET) film covers for shielding air and allowed to stand at room temperature. With the lapse of time, the sheet was measured at intervals for hardness, tensile strength (TS) and elongation in accordance with JIS K-6301.

For comparison purposes, the 2-mm thick sheet was kept open and exposed to air without PET film covers (Comparative Example 1). The same sheet was cured in a mold by heat pressing at 165° C. for 10 minutes (comparative Example 2). These sheets were also measured for physical properties. The results are shown in Table 1.

Example 3

The composition of Example 2 was milled and molded into a cubic body of 10 cm long in each side. The molded body was allowed to stand in air at room temperature for 3 days whereupon the surface layer of about 10 mm deep remained uncured, but the interior had fully cured. At curing intervals of 1, 3 and 7 days, the surface layer and the interior were measured for physical properties, with the results shown in Table 2.

Example 4-5

Silicone rubber compositions were prepared by blending 100 parts of the same organopolysiloxane as in Example 1, 30 parts of Ketjen Black EC (Lion Akzo K.K.) and 40 parts of furnace black HAF (Asahi Carbon K.K.), and adding the same peroxide A to the base compound in the same amounts as in Examples 1 and 2.

The silicone rubber compositions were molded into cubic bodies as in Example 3, which were allowed to stand for curing. The surface layer and the interiors were examined for cured properties, with the results shown in Table 2.

TABLE 2

|  |  | Hardness (JIS A scale) Example | | |
|---|---|---|---|---|
|  |  | 3 | 4 | 5 |
| Surface layer | 1 day | uncured | uncured | uncured |
|  | 3 days | uncured | uncured | uncured |
|  | 7 days | uncured | uncured | uncured |
| Interior | 1 day | 50 | 78 | 71 |
|  | 3 days | 67 | 78 | 72 |
|  | 7 days | 69 | 78 | 73 |

Example 6

A silicone rubber composition was prepared by kneading 100 parts of the same organopolysiloxane as in Example 1 and 45 parts of acetylene black in a pressure kneader, and adding the following peroxide B to the base compound in the amount shown in Table 3.

Peroxide B

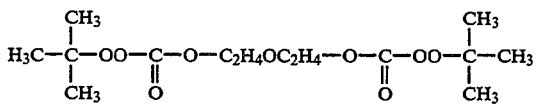

TABLE 1

|  |  | Example | | Comparative Example | |
|---|---|---|---|---|---|
|  |  | 1 | 2 | 1 | 2 |
| Peroxide A, pbw | | 0.75 | 1.0 | 0.75 | 0.75 |
| Vulcanizing conditions | | PET covered, room temperature | PET covered, room temperature | Open air, room temperature | Hot press 165° C./10 min. |
| 1 day | Hardness (JIS A) | 50 | 53 | non-vulcanized | 71* |
|  | TS (kgf/cm²) | 38 | 48 | non-vulcanized | 75* |
|  | Elongation (%) | 290 | 320 | non-vulcanized | 140* |
| 3 days | Hardness (JIS A) | 67 | 70 | non-vulcanized |  |
|  | TS (kgf/cm²) | 62 | 66 | non-vulcanized |  |
|  | Elongation (%) | 190 | 170 | non-vulcanized |  |
| 7 dyas | Hardness (JIS A) | 69 | 71 | non-vulcanized |  |
|  | TS (kgf/cm²) | 66 | 70 | non-vulcanized |  |
|  | Elongation (%) | 170 | 140 | non-vulcanized |  |

*physical properties after heat vulcanization

As seen from Table 1, anaerobic silicone rubber compositions loaded with peroxide A which are molded into a sheet form do not cure at all upon exposure to air, but begin to cure quickly when they are surface covered with film covers and have fully cured within about 3 days into silicone rubber sheets having physical properties comparable to those of the heat cured sample.

Next, the silicone rubber composition was sheeted to a thickness of 2 mm through a twin roll mill. The sheet on both the surface was sandwiched between a pair of PET film covers for shielding air and allowed to stand at room temperature. With the lapse of time, the sheet was measured at intervals for hardness, tensile strength (TS) and elongation in accordance with JIS K-6301. The results are shown in Table 3.

TABLE 3

|  |  | Example 6 |
|---|---|---|
| Peroxide B (pbw) | | 0.75 |
| Vulcanizing conditions | | PET covered, room temperature |
| 1 day | Hardness (JIS-A) | 51 |
|  | TS (kgf/cm$^2$) | 40 |
|  | Elongation (%) | 320 |
| 3 days | Hardness (JIS-A) | 70 |
|  | TS (kgf/cm$^2$) | 67 |
|  | Elongation (%) | 230 |
| 7 days | Hardness (JIS-A) | 72 |
|  | TS (kgf/cm$^2$) | 67 |
|  | Elongation (%) | 190 |

As seen from Table 3, an anaerobic silicone rubber composition loaded with peroxide B which is molded into a sheet form does not cure at all upon exposure to air, but begins to cure quickly when it is surface covered with film covers and has fully cured within about 3 days into a silicone rubber sheet having physical properties comparable to those of the heat cured sample.

Example 7 & Comparative Examples 3-4

In 50 parts of toluene was dissolved 100 parts of an organopolysiloxane consisting of 98.975 mol % of dimethylsiloxane units and 1.0 mol % of methylvinylsiloxane units and blocked with 0.025 mol % of a dimethylvinylsilyl group at each end and having a viscosity of $1 \times 10^7$ cs at 25° C. To this solution was added 150 parts of a silicone resin I solution which was separately prepared by dissolving a silicone copolymer consisting of Me$_3$SiO$_{\frac{1}{2}}$ units (M units) and SiO$_2$ units (Q units) in a molar ratio of M/Q of 0.75 and having a viscosity of 850 centipoise at 25° C. in toluene and had a non-volatile content of 70.5% by weight. The mixture was heated at 150° C. for 2 hours, obtaining a liquid composition (I) having a viscosity of 3,000 cs at 25° C. and a non-volatile content of 68.7% by weight.

To 100 parts of liquid composition (I) was added 2 parts of acetylene black (Denki Kagaku K.K.). The mixture was uniformly milled in a three roll mill. An adhesive composition was prepared by adding 1 part of glycidoxypropyltrimethoxysilane and 1 part of peroxide A as used in Example 1 to the mixture (Example 7).

For comparison purposes, an adhesive composition was similarly prepared except that peroxide A was omitted (Comparative Example 3).

Each of the adhesive compositions was coated to an aluminum panel to a thickness of 0.5 mm and aged at room temperature for 15 minutes. Then a silicone rubber sheet of 2 mm thick which was molded and vulcanized in situ was compression bonded to the coated panel under a pressure of about 1 kgf/cm$^2$. The test piece was measured at intervals for the bonding force between the aluminum panel and the silicone rubber sheet. The results are shown in Table 4.

For comparison purposes, a test piece was prepared using Silicone Sealant 45 which was a silicone adhesive commercially available from Shin-Etsu Chemical Co., Ltd. (Comparative Example 4). The results of this test piece are also shown in Table 4.

TABLE 4

|  | Bonding force (kgf/cm$^2$) | | |
|---|---|---|---|
|  | Example | Comparative Example | |
|  | 7 | 3 | 4 |
| 30 minutes | 1.5 | 1.5 | 0.1 |
| 10 hours | 1.6 | 1.5 | 0.3 |
| 15 hours | 1.8 | 1.5 | 1.0 |
| 24 hours | 2.0 | 1.6 | 1.8 |
| 48 hours | 2.3 | 1.6 | 3.0 |
| 72 hours | 3.0 | 1.6 | 3.5 |

Example 8 & Comparative Example 5

A liquid composition (II) was prepared in the same manner as in Example 7 except that the silicone resin I solution was replaced by a silicone resin II solution which was prepared by dissolving a silicone copolymer consisting of ViMe$_2$SiO$_{\frac{1}{2}}$ units (M units) and SiO$_2$ units (Q units) in a molar ratio of M/Q of 0.75 and having a viscosity of 850 centipoise at 25° C. in toluene and had a non-volatile content of 69.5% by weight. Liquid composition (II) had a viscosity of 3,000 cs at 25° C. and a non-volatile content of 68.7% by weight.

As in Example 7, an adhesive composition was prepared using liquid composition (II), and a test piece was assembled using the adhesive for determining a change of bonding force with time.

For comparison purposes, an adhesive composition was similarly prepared except that peroxide A was omitted (Comparative Example 5). Using the adhesive, a test piece was similarly assembled for determining a change of bonding force with time. The results are shown in Table 5.

TABLE 5

|  | Bonding force (kgf/cm$^2$) | |
|---|---|---|
|  | Example 8 | Comparative Example 5 |
| 30 minutes | 1.5 | 1.5 |
| 10 hours | 1.7 | 1.5 |
| 15 hours | 1.9 | 1.5 |
| 24 hours | 2.0 | 1.6 |
| 48 hours | 3.0 | 1.6 |
| 72 hours | 5.0 | 1.6 |

Example 9

To 100 parts of liquid composition (I) used in Example 7 was added 2 parts of acetylene black (Denki Kagaku K.K.). The mixture was uniformly milled in a three roll mill. An adhesive composition was prepared by adding 1 part of glycidoxypropyltrimethoxysilane and 1 part of peroxide B as used in Example 6 to the mixture.

The adhesive composition was coated to an aluminum panel to a thickness of 0.5 mm and aged at room temperature for 15 minutes. Then a silicone rubber sheet of 2 mm thick which was molded and vulcanized in situ was compression bonded to the coated panel under a pressure of about 1 kgf/cm$^2$. The test piece was measured at intervals for the bonding force between the aluminum panel and the silicone rubber sheet. The results are shown in Table 6.

TABLE 6

| | Bonding force (kgf/cm$^2$) Example 9 |
|---|---|
| 30 minutes | 1.6 |
| 10 hours | 1.8 |
| 15 hours | 1.9 |
| 24 hours | 2.1 |
| 48 hours | 2.4 |
| 72 hours | 3.3 |

There has been described a silicone rubber curing method which uses an anaerobic silicone rubber composition comprising components (A), (B) and (C) and having anaerobic curing capability in that it can cure at room temperature in closed conditions or in the absence of air or oxygen whereby the composition cures into silicone rubber having physical properties equivalent to those of conventional heat cured silicone rubber. The application of silicone rubber is thus expanded to screw attachment, joint bonding and sealing. An anaerobic adhesive composition having additional component (D) blended can quickly cure under anaerobic conditions while exhibiting good adhesion from an early stage of curing. The composition is thus a very useful silicone sealant which may be used in bonding silicone gaskets for providing waterproof seals. It provides for efficient manufacture of waterproof sealed wall panels, for example.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A method for producing a silicone rubber by curing a silicone rubber composition under anaerobic conditions, said silicone rubber composition comprising (A) an organopolysiloxane of the general formula (1):

$$R^1{}_a SiO_{(4-a)/2} \quad (1)$$

wherein $R^1$ is independently selected from substituted or unsubstituted monovalent hydrocarbon radicals, and letter a is a positive number of from 1.90 to 2.05.

(B) an organic peroxide of the general formula (2):

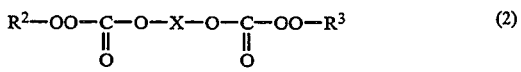
(2)

wherein X is a radical of the following formula (3), (4) or (5):

—(CH$_2$)$_n$— (3)

(4)

—(C$_2$H$_4$O)$_m$—C$_2$H$_4$— (5)

wherein n is an integer of 2 to 8 and m is an integer of 1 to 4, $R^2$ and $R^3$ are each a monovalent hydrocarbon radical having 3 to 10 carbon atoms or a radical of the following formula (6):

$$-SiR^4{}_3 \quad (6)$$

wherein $R^4$ is an alkyl or aryl radical, and (C) carbon black.

2. The method of claim 1 wherein said silicone rubber composition further comprises (D) an organopolysiloxane copolymer consisting essentially, of $R^1{}_3SiO_{\frac{1}{2}}$ units (M units) and SiO$_2$ units (Q units) wherein $R^1$ is as defined above, the molar ratio of M/Q being from 0.6 to 0.9.

3. The method according to claim 1, component A, wherein said $R^1$ is substituted or unsubstituted monovalent hydrocarbon radicals having 1 to 10 carbon atoms.

4. The method according to claim 3, wherein said substituted or unsubstituted monovalent hydrocarbon radicals have 1 to 8 carbon atoms.

5. The method according to claim 1, wherein said organopolysiloxane of general formula (1) has 0 to 10 mol % of an alkenyl radical based on the total moles of $R^1$ radicals.

6. The method according to claim 5, wherein said organopolysiloxane of general formula (1) has 0.05 to 5 mol % of an alkenyl radical based on the total moles of $R^1$ radicals.

7. The method according to claim 5, wherein said organopolysiloxane of general formula (1) has 0.0001 to 0.5 mol % of an alkenyl radical based on the total moles of $R^1$ radicals.

8. The method according to claim 7, wherein said organopolysiloxane of general formula (1) has a degree of polymerization of at least 3,000.

9. The method according to claim 1, wherein $R^4$ is an alkyl radical having 1 to 8 carbon atoms or an aryl radical having 6 to 10 carbon atoms.

10. The method according to claim 1, wherein said organic peroxide of general formula (2) is present in an amount of about 0.1 to 5 parts per 100 parts by weight of said organopolysiloxane.

11. The method according to claim 2, wherein said organic peroxide of general formula (2) is present in an amount of about 0.1 to 5 parts per 100 parts by weight of said organopolysiloxane and said organopolysiloxane copolymer.

12. The method according to claim 1, wherein said organic peroxide of general formula (2), is present in an amount of about 0.5 to 3 parts per 100 parts by weight of said organopolysiloxane.

13. The method according to claim 2, wherein said organic peroxide of general formula (2) is present in an amount of about 0.5 to 3 parts per 100 parts by weight of said organopolysiloxane and said organopolysiloxane copolymer.

14. The method according to claim 1, wherein said carbon black is selected from the group consisting of acetylene black, conducting furnace black, super conducting furnace black, extra conducting furnace black, conducting channel black and furnace black.

15. The method according to claim 1, wherein said carbon black is present in an amount of about 0.1 to 100 parts per 100 parts by weight of said organopolysiloxane.

16. The method according to claim 2, wherein said carbon black is present in an amount of about 0.1 to 100 parts per 100 parts by weight of said organopolysiloxane and said organopolysiloxane copolymer.

17. The method according to claim 1, wherein said carbon black is present in an amount of about 1 to 70 parts per 100 parts by weight of said organopolysiloxane.

18. The method according to claim 2, wherein said carbon black is present in an amount of about 1 to 70 parts per 100 parts by weight of said organopolysiloxane and said organopolysiloxane copolymer.

19. The method according to claim 2, wherein the weight ratio of said organopolysiloxane to said organopolysiloxane copolymer is from 30/70 to 70/30.

20. The method according to claim 19, wherein the weight ratio of said organopolysiloxane to said organopolysiloxane copolymer is from 40/60 to 60/40.

* * * * *